AIR CONDITIONING
Original Filed March 13, 1956 3 Sheets-Sheet 1
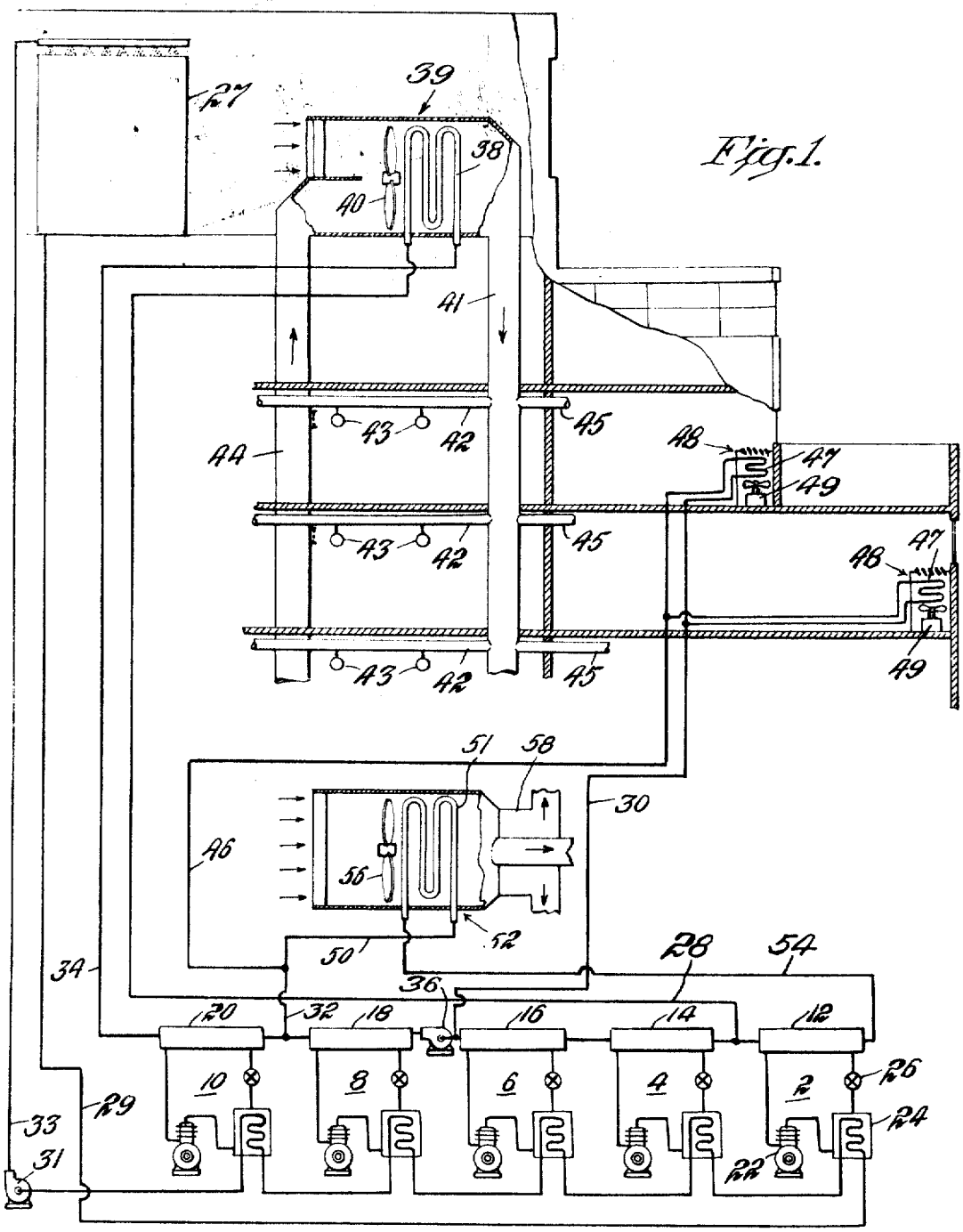
INVENTOR
ALDEN I. McFARLAN
BY
Curtis, Morris & Safford
ATTORNEYS AIR CONDITIONING
Original Filed March 13, 1956 3 Sheets-Sheet 2
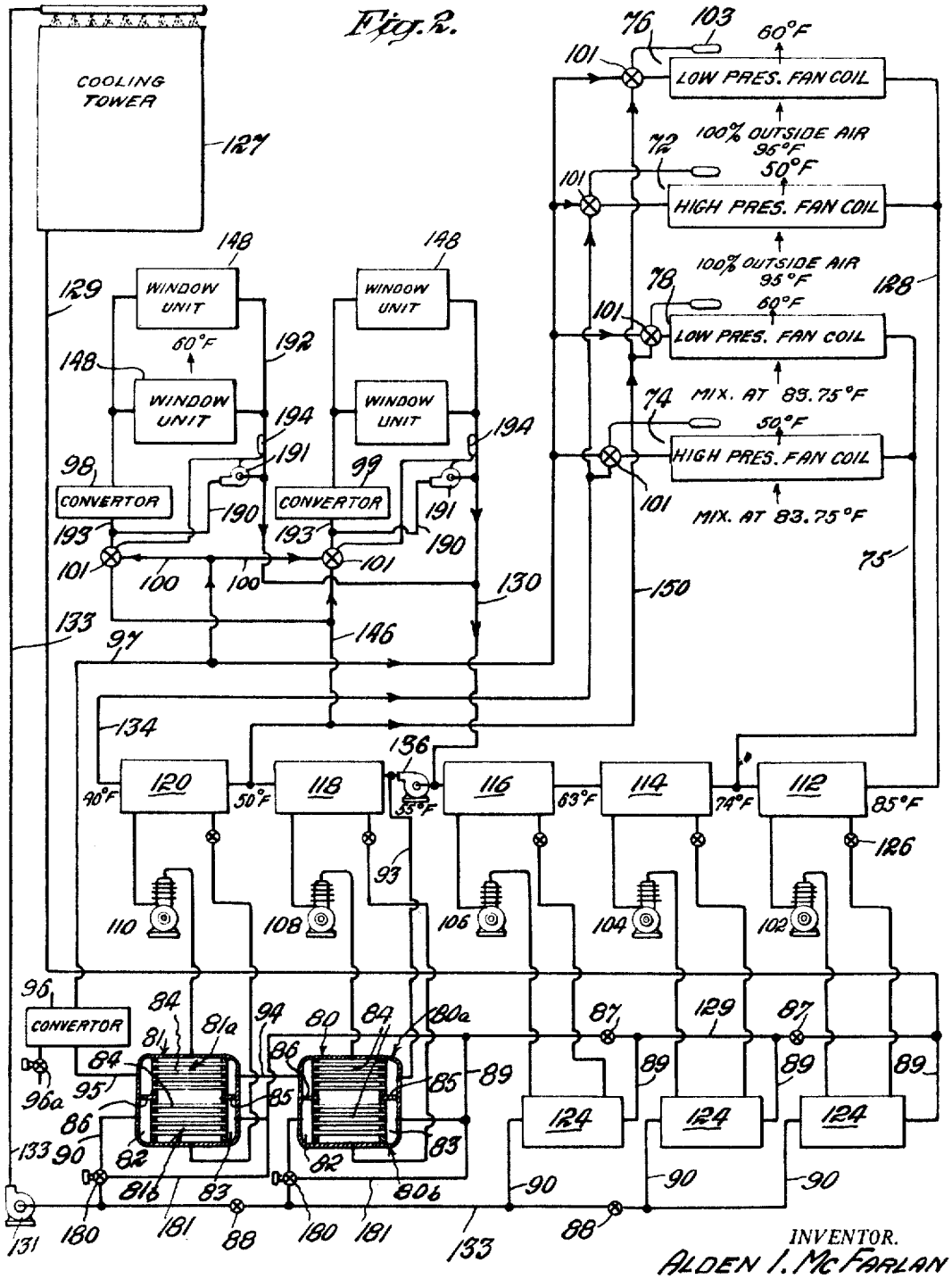
INVENTOR.
ALDEN I. McFARLAN
BY
Curtis, Morris & Safford
ATTORNEYS

AIR CONDITIONING

Original Filed March 13, 1956 3 Sheets-Sheet 3

INVENTOR.
ALDEN I. McFARLAN

BY

Curtis, Morris and Safford
ATTORNEYS

United States Patent Office

Re. 26,391
Reissued May 21, 1968

26,391
AIR CONDITIONING

Alden I. McFarlan, 691 Dorian Road,
Westfield, N.J. 07090

Original No. 2,984,458, dated May 16, 1961, Ser. No. 571,211, Mar. 13, 1956. Application for reissue Apr. 12, 1962, Ser. No. 188,005
28 Claims. (Cl. 165—22)

Matter enclosed in heavy brackets [ ] appears in the original patent but forms no part of this reissue specification; matter printed in italics indicates the additions made by reissue.

The present invention relates to air conditioning, and more in particular to an improved air conditioning system for cooling or cooling and heating buildings where the air conditioning requirements vary in different compartments, spaces, or zones in the building.

In large office buildings, the various spaces may be used for other purposes than offices, such as stores, restaurants and the like. Many multiple-purpose buildings, such as terminals for railroads or buses have waiting rooms, auditoriums and offices, as well as stores, restaurants and the like. Even residences have variable loads due to picture windows, kitchens, etc. The various spaces, compartments, and zones of such buildings have different air-conditioning load requirements in general, and specific requirements at any particular time. For example, some compartments of the building produce a high latent-cooling load in summer and the air serving such an area must therefore be cooled to a relatively low temperature, while other compartments produce a high sensible load with a minor latent-cooling load which areas may be satisfied by air cooled at a higher temperature. Still other zones or compartments require the air to be cooled between fixed temperature limits in order to assure no latent-cooling removal because of the problem of condensate disposal, notably induction type window units. Some interior compartments or zones of the building may require cooling in both summer and winter while exterior compartments or zones require cooling in summer and heating in winter with some of these exterior compartments requiring heating and cooling at different portions of the same day during some seasons. A large building with interior areas may require cooling, while the exterior simultaneously requires heating.

Air for any zone of a building must be cooled to a temperature low enough to pick up both the sensible and latent heat in the zone to produce comfort conditions. As the air must be cooled to a temperature to meet both of these requirements which may vary in relation to each other in the different zones and in a particular zone from hour to hour, it is apparent that the air should be cooled to different temperatures at different zones and in any one zone at different times during a day to properly satisfy the requirements. For example, the exterior of a building subject to sun effect and having few occupants may have a high sensible load and low latent load. This type of load would be satisfied by air leaving the cooling coil at a relatively high temperature in the range of 60° F. to 63° F. The interior area is not subject to sun effects and usually has many more people per unit of floor space and produces a smaller sensible load but a greater latent load. Therefore, a lower air temperature leaving the cooling coil and, when water is used as a cooling medium, a lower water temperature is required for the air conditioning units serving the internal area. This type of load would require a temperature of air leaving the cooling coil in the range of 50° F. to 60° F.

Many air conditioning systems, notably the common high velocity systems, cool air to approximately 50° F.

in order to use less air and reduce the duct size. Necessarily, these particular temperatures are correct for only one particular condition of latent and sensible cooling, but the system may be purposely designed to handle excess latent removal for a greater part of the cooling season in order to use small ducts. However, a higher temperature may be used to satisfy the momentary sensible load which, in turn, will permit operation at a higher water temperature and thus save a substantial amount of unnecessary latent load removal.

It is also apparent that air cooled to a lower temperature than required for a particular condition imposes an unnecessary load on the refrigeration apparatus above peak requirements, and necessitates the use of more equipment in the form of compressors, water coolers, condensers, cooling tower, conduits, pumps, etc. Furthermore, the horsepower required per ton of refrigeration increases with each degree drop in the temperature produced. It is therefore not only desirable to vary the water temperature to reduce the thermal head on the system for optimum conditions and thus reduce compressor horsepower to a minimum, but also is desirable to produce optimum conditions with minimum equipment. It is equally desirable to operate at the highest momentary water temperature possible to reduce the momentary operating expense to a minimum.

Heretofore, it has been the more common practice to provide separate heating and cooling systems in buildings. When the space is cooled by a chilled water air conditioning system, it has been the practice to chill water to the lowest temperature required for any particular condition, which temperature is maintained constant, and then to use this low-temperature water throughout the building for all operating conditions. Such use of low temperature chilled water from one source for all purposes in a building may be unnecessary, wasteful and uneconomical as the cost of chilling water below a certain temperature level is greater per ton of refrigeration produced than the cost of chilling water above that level and the cost progressively increases for each additional degree of cooling. This increased cost resides in both the initial cost of equipment required and the horsepower to produce the capacity at low temperature as explained above. Also, at reduced capacity the air should be cooled at a higher temperature, even though the refrigeration capacity is available to produce a lower temperature in order to reduce the cost and to prevent excess latent cooling which is wasteful.

An object of this invention is to provide an improved chilled water air conditioning system for both cooling and heating a multiple zone building in a more economical manner than the chilled water systems heretofore used. A further object is to provide an air conditioning system of the above character which is highly efficient under all conditions of operation, especially at reduced loads and varying loads, and overcomes difficulties which have been encountered with prior systems. These and other objects will be in part obvious, and in part pointed out below.

In the drawing:

FIGURE 1 is a somewhat schematic representation of an air cooling system constituting one embodiment of the invention; [and,]

FIGURE 2 is a schematic representation of an air conditioning system for both heating and cooling, and constitutes another embodiment of the invention;

Figure 4:
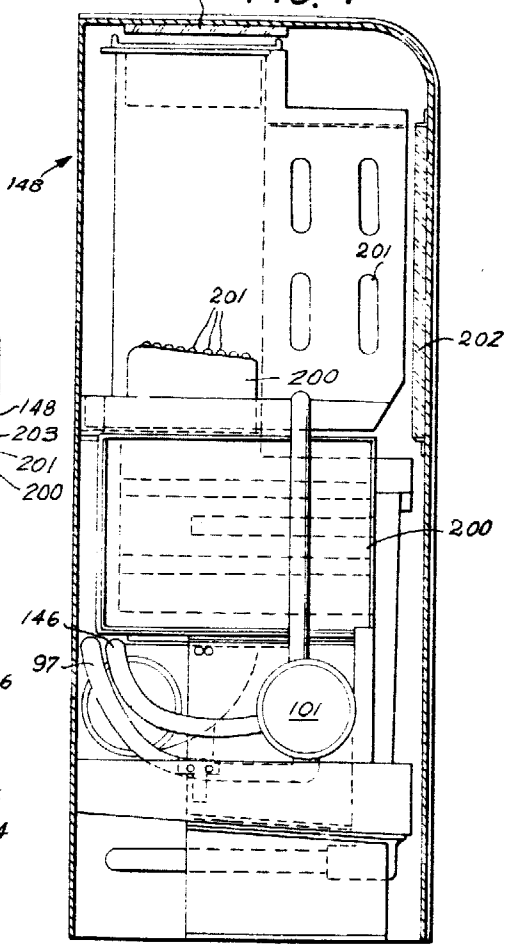
*FIGURE 4 is an enlarged sectional view showing one of the induction units of the system of FIGURE 3.*

In the embodiment of the invention illustrated in FIGURE 1, the air conditioning system provides for cooling air in the various zones in the building, and for supplying air to each of the zones to maintain the desired humidity and temperature conditions. The cooling of the air for a particular area or space is performed by passing it in heat exchange relation with a coil through which chilled water is circulated from a central water cooling system. The water cooling system may comprise a plurality of separately operated refrigeration systems or a plurality of separate water chilling evaporators connected to different stages or units of a single refrigeration system of the centrifugal or reciprocating compressor or absorption types which operate at different and progressively lower evaporator temperatures to cool the water in stages in a highly efficient manner as it flows in a stream through the evaporators in series. Chilled water is withdrawn from the stream at the end of the last stage or between stages of the series, and supplied to the various air cooling units at the temperature required for the conditions in the areas serviced by the units. Similarly, chilled water is returned to the stream at the first stage or between stages depending upon its temperature.

The various rooms or zones having the same or similar sensible and latent heat ratios are combined in a group so far as is possible or practical for servicing by the same cooling unit; and each unit for servicing a plurality of zones so grouped is served, in turn, by a stream of chilled water having the most desirable temperature. The desired water temperature is obtained by bleeding chilled water from the staged refrigeration apparatus at the highest possible temperature for the most economical operation. To vary the coil temperature of an air cooling unit, the chilled water and recirculated warmer water in separate streams are mixed by a control valve to the unit to produce the exact air temperature desired for delivery to the zone or zones instead of mixing air streams or cooling and reheating an air stream in accordance with usual practice.

Furthermore, deep coils are provided which are arranged for countercurrent flow of chilled water and air to be cooled. The deep coils produce a temperature drop of both chilled water and air over a wide range with a close temperature difference between the media. The air leaving the coil so closely approaches saturation that the dew point and consequently the zone humidity can be controlled from a dry bulb temperature controller and does not require a more expensive dew point controller or humidistat. Such a dry bulb temperature control is simpler, less expensive, more dependable and generally more satisfactory.

In the preferred embodiment of the invention, the air conditioning system provides for heating the separate spaces in winter, as well as cooling the spaces in summer, or simultaneously cooling certain spaces while heating other spaces and utilizing the heat absorbed in certain areas for, at least in part, heating other areas where heating is required.

FIGURE 1 shows a cooling system incorporating the chilled water tap off feature of the present invention in its simplest form, but it will be understood that the system in most instances would incorporate a heating system such as, for example, a heating system like that illustrated in FIGURE 2. The refrigeration system as illustrated in FIGURE 1 has five separate and independent refrigerating units or stages 2, 4, 6, 8 and 10 which have evaporator chillers 12, 14, 16, 18 and 20, respectively, within which water is cooled by direct expansion of the refrigerant. Each of the refrigerating units includes a compressor 22, a water cooled condenser 24, an expansion valve 26, interconnecting refrigerant lines, and standard controls. The condensers 24 of the plurality of refrigeration units 2, 4, 6, 8 and 10 are connected in series to be cooled by water from a cooling tower 27 supplied through line 29 to the condenser of the first unit 2 and is returned to the cooling tower from the last condenser of the series by a pump 31 and line 33. A stream of the water to be cooled flows through a line 54 to evaporator 12 of the first stage, and thence through the other evaporators 14, 16, 18 and 20 of successive stages in series. Additional water to be cooled enters the stream through a line 28 between evaporators 12 and 14 and a line 30 between evaporators 16 and pump 36. The temperature of the water is progressively reduced as it flows through the series of evaporators. Water is withdrawn or tapped from the stream at one temperature through a line 32 between evaporators 18 and 20 and from evaporator 20 at its lowest temperature through line 34, all for purposes explained below. A pump 36 is provided in the chilled water line between evaporative chillers 16 and 18 which produces a flow in the line and directs chilled water through the lines 32 and 34.

Chilled water in line 34 is directed by pump 36 to the penthouse of the building, in this particular case, where it passes through a cooling element or coil 38 in an air cooling unit 39. A mixture of fresh and return air is directed through this coil by a blower 40 in a direction countercurrent to the direction of flow of chilled water, thus to cool and dehumidify the air. The water returns from coil 38 through line 28 to the chilled water stream between evaporator chillers 12 and 14. The air cooled and dehumidified in unit 39 is delivered through a main duct 41 and a plurality of branch ducts 42 to different areas at the interior of the building where it is delivered through diffusers 43. Air is returned from the interior of the building to the unit 39 through a common duct 44. For purposes of illustration, branch ducts 45 are shown leading from the main duct 41 to the exterior areas of the building for supplying dehumidified air thereto for ventilation.

The water which is withdrawn from the chilled water stream through the line 32 is divided into two streams with one stream flowing through a line 46 to air-cooling coils 47 in a large number of fan-coil air cooling units 48 in various zones throughout the building, only two of which are shown. Each of these fan-coil units 48 has a cooling element or coil 47 and fan 49 for circulating and cooling the air in the various zones in the outside areas. The fan 49 of each cooling unit 48 draws in air from its particular zone, forces it through the coil 47 where it is cooled and returns it to the zone. The water from the coils 48 returns through line 30 to the water cooling circuit between the evaporators 16 and pump 36, as discussed above.

The other stream of chilled water from line 32 flows through line 50 to a cooling element or coil 51 in an air-cooling unit 52, and is returned from this coil through a line 54 to chiller 12. As indicated above, line 54 directs the return water into the first water chiller 12 of the series in the water-cooling circuit. A fan 56 directs fresh air through coil 51 in a direction counter-current to the flow of chilled water and the cooled air is distributed by conduits 58 to various areas or spaces which require a hundred percent fresh air.

As indicated above, in this particular system dehumidified air is delivered to the exterior areas for ventilation through branch conduits 45 from the air-cooling and dehumidifying unit 39. Unit 39 also supplies air to the interior zones of the building through the branch conduits 42. Air is withdrawn from the various interior areas of the building through an interior return conduit 44, and fresh air is mixed with this recirculated air to provide the air passing over coil 38.

In accordance with the present invention, chilled water is supplied to each of the various air-cooling units 39, 48, and 52 at the temperature required for the particular conditions and demands in the space or zone which it services. In the illustrative embodiment, the air-cooling unit 39 supplies air dehumidified by cooling to the interior and exterior areas of the building through duct 41 and branches 42 and 45. Such dehumidification of the air requires cooling water at the lowest temperature which is supplied through line 34 from the last chiller 20 of the series. On the other hand, the load on the fan-coil units 48 is practically all sensible cooling, and the air in these units is cooled by higher temperature water withdrawn from the stream in line 32 between chillers 18 and 20 of the series. Likewise, air leaves unit 52 at a sufficiently high temperature so that it can be cooled by a higher temperature chilled water than unit 39 and which may be bled off the staged cooler before the last stage and thus reduce the compressor horsepower per ton of refrigeration required. As air conditioning unit 52 has a deep coil and handles all fresh air which enters at a high temperature, the water leaves this unit at a relatively high temperature to obtain maximum cooling of air per pound of chilled water circulated, and the water is returned to the water chiller 12 of the first refrigerating unit 2 of the series.

As stated above, relatively cold dehumidified air is supplied to the areas serviced by the zone units 48 from the central unit 39, and the relative humidity in the interior areas is maintained within acceptable limits solely by the introduction of the desirable amount of this dehumidified air. This regulation of the relative humidity in the interior spaces is obtained by controlling the temperature of the water entering or air leaving the coils of unit 39. The coils 47 in zone units 48 are not deep as in units 39 and 52 because of space limitations and handle all recirculated air and therefore have only a limited temperature range. Thus, chilled water is supplied to units 48 through a line 46 connected between chillers 18 and 20 and is returned through line 30 connected between chillers 16 and pump 36 at the particular temperature limits corresponding to the temperature drop in coils 47 to improve compressor efficiency and reduce the cost of the refrigeration produced.

The chilled water air conditioning system of the present invention provides for a more economical installation and operation as it supplies chilled water at the temperature required for the particular operating conditions. As the cost of chilling water per ton of refrigeration produced progressively increases with each degree of reduction in temperature, the use of chilled water at high temperatures to produce the same cooling effect as water at a lower temperature results in an improvement which may be utilized to reduce the size of the refrigeration equipment required and to reduce the power required to operate the units. In addition, the present invention contemplates the use of coils 38 and 51 in units 39 and 52 of a depth in the direction of air flow to cool the air through a maximum temperature range of the chilled water.

For example, coil 38 of a cooling unit 39 is constructed and arranged to handle the amount of air required for the interior and exterior areas of at least a portion of the building comprising 25% fresh air at 95° F. and 75% return air at 80° F., providing a mixture at 83.75° F. and to cool this mixture to 50° F. with chilled water entering the coil at 40° F. and leaving at 74° F. Coil 51 of unit 52 is constructed and arranged to handle and cool the required amount of fresh air from 95° F. to 60° F. using chilled water entering the coil at 50° F. and leaving at 85° F. Coils 47 of zone units 48 are constructed and arranged to handle and cool the required amount of recirculated air from 80° F. to 65° F. using chilled water entering the coils at 50° F. and leaving at 55° F.

Thus, instead of using low temperature chilled water for all purposes, the system constituting the present invention utilizes chilled water at the temperature required for each particular set of conditions and utilizes the cooling capacity of the water to the best advantage to cool and dehumidify the air as required. The use of higher temperature chilled water for removing sensible heat from the air reduces the compression ratio between the suction and condenser pressures of the refrigerating units and this increases the compressor capacity and reduces the power required to produce the same cooling effect. By utilizing deep coils to cool air through the entire temperature range of the chilled water, there are many advantageous results, including reductions in: the sizes of the chilled water distribution and return lines, the amount of insulation, the number and types of controls, the size of valves and pumps, and the space requirements for the various components of the system.

The embodiment of the invention of FIGURE 2 is similar to the embodiment of FIGURE 1 but, in addition, provides for heating the different areas and zones with the same air conditioning units used for cooling and other features of a system for both heating and cooling. The refrigeration system in FIGURE 2 comprises five refrigerating units 102, 104, 106, 108 and 110 having evaporator chillers 112, 114, 116, 118 and 120, respectively, as in FIGURE 1. A pump 136 in the chilled water stream between evaporator chillers 116 and 118 delivers chilled water from the last chiller 120 through a line 134 to air conditioning units 72 and 74. Unit 72 is illustrated by way of example as a typical high velocity delivery system using smaller ducts which is adapted to receive 100% fresh outside air at a maximum design condition of 95° F., dehumidify the air by cooling it to the required dew point and then deliver the dehumidified air at 50° F. to the space or zones to be conditioned in high velocity conduits. The chilled water enters unit 72 at 40° F. and leaves at 85° F. to cool through a range of 45° F. Water is returned from unit 72 through a line 128 to the first chiller 112 of the series. Such a cooling unit 72 is adapted to supply ventilating air to the exterior areas of a building serviced by fan-coil units in different zones, such as units 48 illustrated in FIGURE 1, or to supply primary air to induction window units.

Figure 3:
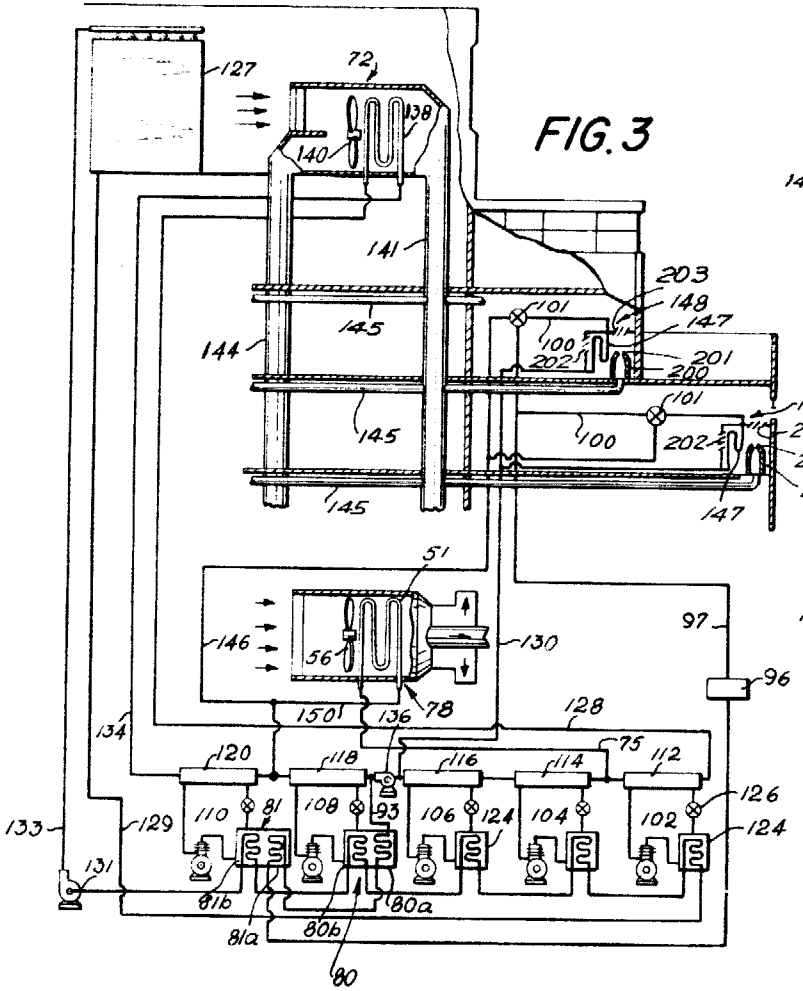
*FIGURE 3 is a view similar to FIGURE 1 showing the heating and cooling system of FIGURE 2 applied to room air induction units; and,*

*In a typical air conditioning system and specifically a conventional induction system, induction units are provided in or near various rooms to be air conditioned. FIGURE 3 illustrates an air conditioning system like that in FIGURE 1 and including window units 148 of the air induction type. Each air induction unit 148 (corresponding to fan coil unit 48 in FIGURE 1) comprises a heat exchange coil 147, a plenum chamber 200 (see also FIGURE 4) having air discharge nozzles 201, an air inlet 202 through which room air enters the unit and an air outlet 203 from which air is discharged into the room to be conditioned. Such air induction units were known and well understood in the art prior to the present invention and are shown in prior art patents such as, for example, the one to W. H. Carrier, No. 2,363,294, issued Nov. 21, 1944.*

*Primary air, cooled and dehumidified in a conditioning unit such as unit 72 (corresponding to unit 39 in FIGURE 1), is delivered to the air induction units 148 through conduits 141 and 145 (corresponding to conduits 41 and 45 in FIGURE 1) and connected to the plenum chamber 200 of the air induction units 148. Conduits 141 and 145 serve to connect the primary air conditioning unit 72 to the various induction units 148. Lines 97 and 146 for hot and cold water, respectively, are connected to valves 101 each of which, in turn, is connected to one end of a heat exchange coil 147 of its induction unit 148, and the opposite end of the coil is connected to the common return line 130, as later described more in detail. A fan 140 is provided of sufficient capacity to deliver the dry, cool primary air to all of the units 148 at the required static pressure and quantity to escape through the nozzles 201 at a velocity to induce flow of room air over the heat exchange coils 147.*

Unit 74 is illustrated by way of example as a typical high velocity central duct or low humidity fan-coil system adapted to receive a mixture of outside fresh air and return air as, for example, 25% fresh air at 95° F. and 75% return air at 80° F. to provide a mixture at 83.75° F. which is dehumidified by cooling and delivered at 50° F. by a fan to the space or zones to be conditioned. Chilled water enters unit 74 at 40° F. and leaves at 74° F. to cool through a range of 34° F. Water is returned from unit 74 through a separate line 75 to the chilled water stream between chillers 112 and 114. Such a unit 74 is adapted to supply cool dehumidified air to a heavily populated interior area of a building or to a research laboratory or other space where greater than normal dehumidification is required or for some other reason lower than normal air temperature is required, or where a minimum quantity of cold air is to be supplied, such as a high velocity system.

Chilled water at a higher temperature is tapped from the chilled water stream between evaporator chillers 118 and 120 and part of the chilled water is delivered through a line 146 to air conditioning units 148 in a plurality of zones in the exterior areas. These units may be fan-coil units, such as units 48 illustrated in FIGURE 1, or may be air induction units of the type in which a jet of primary air induces flow of secondary air in the zone. Such units have shallow coils and, by way of example, are adapted to cool air from 80° F. to 60° F. or 65° F. with chilled water entering the unit at 50° F. and leaving the units at 55° F. Water returns from window units 148 through a line 130 to the chilled water stream at the suction side of pump 136 between chillers 116 and 118.

The other part of the chilled water tapped from the stream between chillers 118 and 120 is delivered through a line 150 to air conditioning units 76 and 78. Unit 76 is illustrated by way of example as a typical low pressure fan-coil system adapted to receive 100% outside fresh air and unit 78 is a unit like unit 76 but adapted to handle a mixture of 25% fresh air and 75% recirculated air. Unit 76 in the illustrated embodiment is adapted to cool air from 95° F. to 60° F. with chilled water entering the unit at 50° F. and leaving at 85° F. Water returns from unit 76 through a line 128 to the first evaporator chiller 112. Such a unit 76 is adapted to air condition areas such as a cafeteria, restaurant or the like.

Unit 78, by way of example, is adapted to cool a mixture of 25% fresh air and 75% return air from 84° F. to 60° F. with chilled water entering the unit at 50° F. and leaving at 74° F. Water returns from unit 78 through line 75 to the chilled water stream between chillers 112 and 114. Such a unit, by way of example, is adapted to air condition areas such as external office areas, stores or the like. As thus far described, the embodiment illustrated in FIGURE 2 is similar to the embodiment illustrated in FIGURE 1.

Each of the refrigerating units 102, 104, and 106 has a condenser 124 as in FIGURE 1, but the last two units 108 and 110 each have a special condenser arrangement adapted to be cooled by one or the other of a plurality of separate streams of cooling medium. The condenser arrangement may comprise a plurality of separate condensers connected either in parallel or series in the refrigerant circuit or a plurality of condensers in a single shell with one of the streams of cooling medium flowing through one of the condensers of each unit and the other stream flowing through the other condenser of each unit. In the embodiment of the invention illustrated in FIGURE 2, condenser units 80 and 81 are provided for the refrigeration units 108 and 110 and each condenser unit 80 and 81 comprises separate condensers 80a, 80b and 81a, 81b, having separate paths of flow for the different streams of cooling medium. Each condenser unit 80 and 81 is shown as a shell and tube type having headers 82 and 83 at opposite ends with tubes 84 extending therebetween. Headers 82 and 83 have division walls 85 and 86 to provide upper condenser sections 80a and 81a which, together with their connecting tubes 84, constitute one path of flow for the one condenser water circuit. Similarly, the lower condenser sections 80b and 81b which together with their connecting tubes 84 constitute a separate path of flow for the other condenser water circuit.

The condensers 124 of units 102, 104 and 106 and the lower sections 80b and 81b of condenser units 80 and 81 of units 108 and 110 are connected together in a main condenser water circuit including a cooling tower 127, lines 129 and 133 and a pump 131. The connections between lines 129 and 133 and condensers 124 and lower sections 80b and 81b of condensers 80 and 81 include valves 87 and 88 to adapt the condensers to be connected either in parallel or in series. Each condenser 124 has a line 89 connected to line 129 to supply cooling water thereto and a line 90 connected to line 133 to deliver cooling water therefrom whereby the condensers are connected in parallel. Valves 87 are provided in line 129 between the lead lines 89 to condensers 124 of units 102 and 104 and between condensers 124 of unit 106 and lower section 80b of refrigeration unit 108. Similarly, valve 88 is provided in line 133 between outlet leads 90 from condensers 124 of refrigeration units 104 and 106 and between condenser sections 80b and 81b of refrigeration units 108 and 110. When valves 87 and 88 are closed cooling water enters condenser 124 of unit 102 through line 89 and leaves through line 90 into line 133. Valves 87 and 88 being closed causes the cooling water to flow into condenser 124 of unit 104 through line 90 and out through line 89 to line 129. The cooling water then flows in a similar manner through condenser 124 of unit 106, in a reverse direction through section 80b of unit 108 and through section 81b of unit 110 to connect the condensers in series. Thus, when valves 87 and 88 are open the condensers 124, 80b and 81b of units 102 to 110 are connected in parallel and when the valves are closed the condensers are connected in series.

The cooling water path through the upper sections 80a and 81a of headers 82 and 83 in condenser units 80 and 81 are connected in series in a hot water circuit through which the second stream of water is circulated and heated to progressively higher temperatures. The heated water is used for heating the building when heating is required. The auxiliary hot water circuit comprises a line 93 connecting the chilled water line between pump 136 and chiller 118 of unit 108 to the header of upper section 80a of condenser unit 80. The outlet header from condenser 80 is connected by a line 94 to the inlet header of upper section 81a of condenser unit 81. The outlet header from condenser 81 is connected by a line 95 to a convertor 96 for supplying additional heat to water flowing therethrough. Convertor 96 may be in the form of a fuel fired heater, but here it is illustrated as a stream coil having a control valve 96a operable in response to the requirements at each conditioning unit 72, 74, 76, 78 or zones serviced by units 148. Hot water is delivered from convertor 96 to the air conditioning units 148, 72, 74, 76 and 78 through a line 97. Preferably, additional convertors 98 and 99 are provided in the branch-circuits 100 for feeding hot water to the window units 148 for heating the water supplied thereto to a higher temperature to insure comfort conditions in the zones. Hot water is returned from air conditioning units 148, 72, 74, 76 and 78 through the same lines 128, 130, and 75 as the chilled water, and may flow either to the chilled water stream or to the hot water circuit through the line 93.

A three-way valve 101 is provided at the juncture of each of the chilled water supply lines 134, 146, 150 and hot water supply line 97 to the respective inlets to the air conditioning units 72, 74, 76 and 78 and to each branch 100 for window units 148. Each valve 101 in one of its positions supplies chilled water to its particular air conditioning unit and in another position supplies hot water to the unit in accordance with requirements. Thus, the valves 101 may supply chilled water to all of the units at which time there would be no flow in the hot water circuit. Also, the valves 101 may supply hot water to all of the units at which time there would be no flow in the chilled water circuits. A more usual condition during winter operation would be for certain valves 101 to supply chilled water to the units servicing the interior areas and hot water to the units servicing the exterior areas. Preferably, each valve 101 is operated by a suitable thermostat 103 responsive to the temperature of the air leaving the unit which it controls. The window units 148 may be controlled by a thermostat in a typical location served by the units or by a compensating outdoor thermostat. Also, valves 101 may be operated by a thermostat 103 in the water line to the unit and reset by a thermostat in a typical zone. As an alternative, the valves 101 in window unit systems may be controlled by a compensating outdoor thermostat. The temperatures within rooms may be regulated manually or automatically by means of multiple-speed fans on each window unit. Valves 101 are also adapted to supply a mixture of chilled and recirculated water to any of the coils to produce the exact leaving air temperature for the particular conditions at a particular time which is one of the more important features of this type of system. Thus, for some operating conditions, especially in the spring or fall when less than maximum heating or cooling is required, it may be desirable to supply mixed water from the separate lines to a particular air conditioning unit and it is within the scope of this invention to operate valve 101 so that it supplies chilled water during a cooling down period, hot water during a heating up period and a mixture of both chilled and warm water as the room temperature approaches the thermostat setting.

From the above description, it will be apparent that the embodiment of the invention illustrated in FIGURE 2 operates in substantially the same way as the embodiment illustrated in FIGURE 1 when the temperature in the enclosure being conditioned by a particular air conditioning unit 72, 74, 76, 78 or 148 is above a predetermined temperature, as for example, 76° F. Chilled water for the units is then supplied from and returned to the chilled water stream between the evaporators at the temperature differential required for the particular conditions. As the cooling requirements decrease, the refrigeration units 102, 104, 106, 108 and 110 are successively reduced in capacity to maintain the desired water temperature leaving each evaporator chiller. This assures a proper temperature which may be raised by mixture with recirculated water by valves 101 to adjust the degree of dehumidification for particular conditions and prevent unnecessary dehumidification. Each room served by a window unit 148 on each floor or other zone arrangement may be individually controlled by a bypass valve. Also, units may have a two or three speed fan to provide automatic or manual temperature regulations. When the temperature in the spaces or zones serviced by one or more of the air conditioning units 72, 74, 76, 78 or 148 falls below a predetermined temperature, such as for example, 70° F., the valves 101 for the particular air conditioning unit or units or as reset by a suitable control such as the outside temperature will operate to admit water from the hot water line 97. Water will then flow from the pump 136 through the heating circuit comprising line 93, the upper sections 80a and 81a of condensers 80 and 81, line 95, convertor 96 and line 97 to the particular air conditioning units 148, 72, 74, 76 or 78 requiring heat. Each room served by a window unit 148 on each floor or other zone arrangement may be individually controlled by a bypass valve. Also, units may have a two or three speed fan to provide automatic or manual temperature regulation.

The particular controls for the system may vary in different installations but one example is described. When the outside temperature is 95° F. an inside temperature of 78° F. to 80° F. is generally considered desirable. Such an inside temperature can be obtained with air leaving the coil of a unit 76 or 78 at a temperature from 59° F. to 63° F., depending upon the latent load, with 59° F. required for heavily populated interiors and 63° F. for low populated outside areas, especially on the west side of the building requiring considerable cooling at peak loads. When the outside temperature is at 80° F. with high humidity, then 74° F. to 75° F. is desired with air leaving the coil at 58° F. to 60° F. When the outside temperature is 72° F., then an inside temperature of 70° F. is desirable which can be obtained with air leaving the coils at 57° F. to 59° F. Furthermore, the requirements vary with each installation. When a compensating control is used, which operates to reset the inside dry bulb on a program temperature, or if the inside temperature limit is reset manually by the occupant, then the temperature of the air leaving the air conditioning unit can be controlled within the limits outlined above. The valves 101 are controlled by the temperature of the air leaving the cooling coil as varied by dry bulb temperature of the space conditioned thereby or set by a program outlined above for regulation of each room or zone. As the temperature in the space becomes satisfied, the load on the air conditioning unit decreases which tends to reduce the temperature of the air leaving the unit so that valve 101 is operated to supply a mixture of water from chilled water line 134 or 150 and recirculated or warm water line 97. The dry bulb inside temperature also may be reset by a humidistat in the worst zone and the volume of air reduced to satisfy dew point as the sensible load decreases.

During summer operation when cooling is required, all of the refrigeration units 102, 104, 106, 108 and 110 are in operation. The water flows from the chilled water stream between water chillers 116 and 118 at 55° F. and flows through the upper condensing sections 80a and 81a with some heating during passage therethrough and then through the line 97 to the various units 72, 74, 76 and 78 for mixture with the chilled water at lower temperature in line 134 and 150 to produce the desired coil temperatures in the air conditioning units.

It is to be noted that on peak wet bulb temperature days which never occur with simultaneous peak dry bulb outside temperatures, the reduced sun effect will reduce the sensible load permitting less air and therefore will permit and require water heated by condenser sections 80a and 81a to be recirculated. This means that condensers 81a and 81b are then increasingly assisting the cooling tower condenser at the time the cooling tower has the least capacity, viz. peak wet bulb days. This permits a reduced size of cooling tower or a design for maximum wet bulb which will occur on a peak dry bulb day rather than maximum wet bulb day.

During winter operation when heating is required, at least three of the refrigeration units 102, 104 and 106 will be out of operation. If cooling is required to satisfy any system and heating required simultaneously, then the return water flowing through branch 93 will be heated in the upper condenser sections 80a and 81a and in the convertor 96 to provide hot water to the air conditioning units 72, 74, 76 and 78 which service areas requiring heating. Usually the inside spaces require cooling during all seasons of the year so that certain of the units may be supplying cooled air while other units are supplying heated air.

During the operation in the spring and fall the cooling medium may be circulated in the manner described to absorb heat in the internal spaces and utilize the absorbed heat to heat the exterior spaces with either a small degree of heating by the convertor 96 or a small degree of both heating and cooling by the refrigeration units 108 and 110. In the latter instance, the heat absorbed from the water in chillers 118 or 120 is returned to the hot water line 97 in the upper condenser sections 80a and 81a of the condenser units 80 and 81.

Control means are provided for condenser units 80 and 81 to regulate which of the sections 80a and 81a or 80b and 81b dissipate the heat from the refrigeration units 108 and 110. The control means comprises a valve 180 and a bypass 181 around each of the condenser sections 80b and 81b. The bypass 181 connects lead conduit 89 to the condenser section to the lead conduit 90 from the section and valve 180 is positioned at the juncture of the bypass with lead conduit 90. The valve 180 is operated to bypass an amount of water around the cooling tower condenser sections 80b and 81b so as to maintain a set leaving water temperature from reverse cycle condenser sections 80a and 81a, say 95° F. This valve 180 is for the purpose of regulating heat removal under light heating loads so that the cooling tower condenser sections 80b and 81b will not remove more heat than necessary to satisfy the heating requirements of the sections 80a and 81a. Thus, when no heating is required, the valves 180 of each condenser unit 80 and 81 opens a passage from the condenser sections 80b and 81b and closes bypass 181 so that cooling water in the cooling tower circuit flows through the condenser section. When heating is required, the valves 180 for each unit 80 and 81 modulate or close the outlet from the condenser section 80b or 81b and open the bypass 181 so that the hot water in line 95 does not exceed a set point, say 95° F., and above which temperature, cooling water in the cooling tower circuit flows through the sections of coil 80b and 81b in sufficient quantity to maintain the maximum set temperature in line 95. The water in the hot water line 93, 95, 97 flowing through the condenser sections 80a and 81a then condenses the refrigerant and, in turn, becomes heated to the maximum temperature desired, above which valve 180 allows a modulated amount of water to go through condenser 80b and 81b to maintain this set maximum temperature.

The zone units 148 either of a fan-coil or jet induction type and especially the latter type, of necessity have shallow coils and product a limited heating at the relatively lower water temperature which satisfies the large coils. Accordingly, the additional convertors 98 and 99 are provided in each of the branch circuits 100 serving the units to increase the temperature of the water to that required for particular conditions. For example, when the weather is extremely cold in winter, it may be necessary to increase the temperature of the water supplied to units 148 to 180° F. Passage of such heated water through the coils of the units 148 produces only a small temperature change so that the water may leave at a temperature above 160° F. If such high temperature water is returned through line 130 to the main stream, it is apt to adversely affect the balance of the system and require unnecessary cooling to remove the excess heat in order to supply water sufficiently low to prevent overheating in inside zones. In accordance with the present invention, an auxiliary loop circuit is provided for each group of zone units 148 connected in a branch 100 which comprises a bypass 190 and circulator 191. Each bypass 190 connects the return line 192 from a group of zone units 148 to supply line 193 in front of its convertor 100 to recirculate the high temperature return water through its auxiliary circuit including the convertors 98 or 99 and units 148 of the group. The circulator is located in the bypass 190 and is operated automatically when the temperature of the water leaving units 148 rises above a predetermined value by a suitable thermostat 194. Thermostat 194 also is connected to close valve 101 to its branch 100 when the circulator is in operation. The circulator 191, if a direct displacement pump, is sufficient to prevent flow through the bypass 190, but a valve may be used in conjunction with the circulator when required.

From the above, it will be obvious that the over-all system, as described above, provides either cooling, no cooling or heating when the heat absorbed in some areas exactly equals the heating required in other areas, or heating. The water supplied to each air conditioning unit 72, 74, 76, 78 or 148 is controlled by its individual valve 101 to pass only enough water to produce the desired air temperature leaving units 72, 74, 76 and 78 and water temperature leaving units 148. Since heat may be added to one branch of the system and removed from another branch, then the over-all system transfers the excess heat from one branch to another and only the marginal cooling or heating is supplied as may be momentarily required. The refrigeration units 102, 104, 106, 108 and 110 are rarely ever operated simultaneously with the convertors 96, 98 and 99 as the system distributes the heat from one area to another area where it is required and vice versa.

It will be observed that the separate paths of flow through the condenser units 80 and 81 permit the circulation of a heating medium in a closed circuit in heat exchange with refrigerant from the compressor and air to be heated. Such a closed circuit avoids excessive corrosion or coating of the heat transfer surfaces with mineral scale or foreign materials. The water from the cooling tower 127, on the other hand, flows only in contact with the tubes 85 and headers 83 of condensers 80 and 81 which may be opened for cleaning.

It will now be observed that the present invention provides improved chilled water air conditioning systems adapted for either cooling or heating a multiple zone building in an economical manner and one which is highly efficient and dependable under all operating conditions, and which avoids difficulties heretofore experienced with such systems.

In the specification and claims the terms "chilled water" and "hot water" are intended to include any liquid working medium such as ethylene glycol or other antifreeze solutions. Furthermore, the instant application relates back to the filing dates of my prior applications, Serial No. 226,849, filed May 17, 1951, now abandoned; Serial No. 415,651, filed March 11, 1954, now Patent 2,796,743 issued June 25, 1957; and Serial No. 536,513, filed September 26, 1955, now Patent 2,796,740 issued June 25, 1957, for all common subject.

While two embodiments of the invention are herein illustrated and described, it is to be understood that other changes may be made in the construction and arrangement of elements without departing from the spirit or scope of the invention. Therefore, without limitation in this respect, the invention is defined by the following claims.

I claim:

1. In an air conditioning system for a space to be conditioned, a central refrigeration system comprising a series of independent evaporators in which the refrigerant is maintained at different and progressively lower temperatures in the series and which are adapted to cool water, means for flowing a stream of water in heat exchange relationship with the refrigerant in the respective evaporators of said refrigeration system in series thereby to cool the water in the stream to successively lower temperatures, means to circulate the water at the lowest temperature from the last evaporator of the series through a central air-cooling unit, means to circulate air through said air-cooling unit and thence to the space to be conditioned thus to provide air to said space, means to withdraw chilled water from said stream between two of said evaporators at a higher temperature than said lowest temperature and to deliver said chilled water thus withdrawn to separate zones within said space, and a plurality of air-cooling units comprising one within each of said zones through which said chilled water at said higher temperature circulates thereby to provide for the cooling of air locally within each of said zones, each of said air-cooling units including air circulating means for circulating air in its zone therethrough.

2. In an air conditioning system for a building having separate spaces to be air conditioned and at least one of said spaces having a plurality of windows, an air-cooling unit for supplying air to said space having windows, an air-cooling unit for supplying air to the other spaces, air conditioning units at a plurality of zones in the space having windows, a central refrigeration system comprising a series of independent refrigerant evaporators which are adapted to cool water, said system being operable to maintain the respective evaporators at different temperatures which are progressively lower in the series, means for flowing a stream of water through the respective evaporators of said refrigeration system in series thereby to cool the water in the stream to successively lower temperatures, means to circulate the water at the lowest temperature from the last evaporator of the series through the air cooling unit for supplying air to the space having windows, means to withdraw chilled water from said stream prior to passage through the last evaporator of the series at a higher temperature than said lowest temperature and deliver said chilled water to the air-cooling unit for supplying cooled air to the other spaces, means to withdraw chilled water from the stream between evaporators of the series at a higher temperature than said lowest temperature and deliver said chilled water to the units at the plurality of zones, and means for returning water from the zone units to the stream between evaporators of the series, each of said zone units including an air circulating means for circulating air in its zone through the unit.

3. In an air conditioning system for a building having separate spaces to be air conditioned and at least one of said spaces having windows, an air-cooling unit for mixing fresh air with return air and delivering the mixture to the space having windows, an air-cooling unit for cooling a large percentage of fresh air and delivering it to another of the separate spaces, a plurality of window air-cooling units at the respective windows in a plurality of zones in the first space, a central refrigeration system comprising a series of independent refrigeration units operable to maintain their respective evaporators at different temperatures which are progressively lower in the series, a pump for flowing a stream of water through the respective evaporators of said units in series to cool the water in the stream to successively lower temperatures, a chilled water circuit having a branch for delivering water at the lowest temperature from the last evaporator of the series to the air-cooling unit for delivering air to the space having windows and returning the water between two evaporators of the series, a second circuit branch connected to withdraw water from the stream between two evaporators of the series at a higher temperature and deliver the chilled water to the air-cooling unit for delivering air to the other of said separate spaces and returning the water to the first evaporator of the series, and a third circuit branch for withdrawing chilled water from said second circuit branch for delivery through said window units and thence back to the stream between two evaporators of the series, each of said window units including an air-circulating means for circulating air in the zone adjacent the window through the unit.

4. In an air-conditioning system for a building having a space with a high humidity load and a separate space having a lower humidity load, separate air cooling units for delivering conditioned air to the respective spaces, a staged refrigeration system comprising a series of evaporators operable at different temperatures which are progressively lower in the series and which are adapted to cool water flowing in a stream through the evaporators in succession to progressively lower temperatures from the inlet to the first evaporator to the outlet from the last stage, a chilled water circuit having a branch connecting said air-cooling unit for the space having a high humidity load to the outlet from the last evaporator of the series, said air to be conditioned flowing in a direction counter-current to the flow of chilled water to chill the air to a relatively low temperature and dew point to remove moisture from the air at the rate required, a second chilled water circuit branch for connecting said air-cooling unit for the space having a low humidity load between intermediate evaporators to deliver chilled water to the unit at a higher temperature, and said air flowing in a direction counter-current to the flow of chilled water to chill the air leaving the unit at a higher temperature and dew point than said first unit to remove less moisture from the air to avoid unnecessary dehumidification.

5. In an air-conditioning system for a building having separate spaces producing heat loads of different character and degree, air-cooling means for conditioning air for the particular conditions in the different spaces, said air-cooling means having a plurality of cooling elements operable through different temperature ranges, a central refrigeration system comprising a series of evaporators operable at successively lower temperatures, means for flowing a stream of water through the series of evaporators to cool the water in the stream to successively lower temperatures, and a chilled water circuit having different branches for the air-cooling elements having different requirements with each branch connected to withdraw water from and return water to zones in the stream having substantially the same temperature differential required for its particular air cooling elements.

6. In an air conditioning system for an enclosure having separate spaces producing heat loads of different character, a central refrigeration system comprising a series of independent refrigerating units operable to maintain their respective evaporators at different temperatures which are progressively lower in the series and adapted to cool water flowing in a stream through the respective evaporators of said units to successively lower temperatures, a fluid circuit having means to circulate the water therein, said circuit having a branch through which water at the lowest temperature is delivered from the last of said evaporators to an air-cooling unit for cooling air delivered to a certain space, a circuit to withdraw chilled water from said stream between successive evaporators at a higher temperature and deliver it through another air-cooling unit for cooling air delivered to another space, air-cooling means in particular zones of one of the spaces to be conditioned, and a circuit branch for delivering chilled water from said units to the stream between intermediate evaporators at a higher temperature.

7. An air conditioning system in accordance with claim 5 in which one air-cooling element supplies air to a space, another air-cooling element cools air circulated in a zone of said space, and the chilled water circuit for said last named air-cooling element being connected between points in said stream of water flowing through said evaporators to deliver chilled water at a temperature above the dew point of the air delivered to said space by said one air-cooling unit.

8. An air conditioning system in accordance with claim 5 in which air from one cooling element is supplied to a space having a high latent cooling load, the chilled water circuit supplying chilled water to said air-cooling element at a low temperature to dehumidify the air leaving the unit to a low dew point temperature, air from another of said air cooling elements supplying air to a space having a lower latent load, and the chilled water circuit supplying chilled water to said last named air-cooling element at a higher temperature to dehumidify the air leaving the unit to a higher dew point temperature whereby to avoid unnecessary latent cooling and thereby reduce the refrigeration load and power cost for low temperature cooling.

9. An air conditioning system in accordance with claim 5 in which air from the different cooling elements is supplied to different spaces through ducts, one branch of the circuit delivering chilled water to its cooling element to cool air at one temperature for delivery to a space at low velocity, and another branch delivering chilled water to its cooling element to cool air to a lower temperature for delivery to a space at high velocity whereby to reduce the size of the duct required.

10. In an air conditioning system for a building in which different spaces have different air conditioning requirements, air conditioning means for conditioning air for the particular conditions in the different spaces, said air conditioning means having a plurality of heat exchange elements, a staged refrigeration system comprising at least one condenser and a plurality of evaporators in which refrigerant is maintained at different and progressively lower temperatures, a closed circuit for the plurality of heat exchange elements having a branch for directing a stream of water through the evaporators in series to cool the water to successively lower temperatures, a branch connected in parallel with the first branch for directing a stream of water through the condenser to heat the water, said chilled water branch having different lines for supplying chilled water to the different heat exchange elements of the air conditioning means, said lines being connected at different points in the chilled water stream to deliver chilled water to the respective heat exchange elements at the temperature required for the load on the particular element, said hot water branch connected to deliver water from the hot water stream to the plurality of heat exchange elements, valve means for each heat exchange element to control the flow of water thereto from the chilled and hot water branches of the circuit, return means connected to deliver water from the plurality of heat exchange elements to both the chill water and hot water branches, and a single pump for circulating water through both branches of the closed circuit.

11. An air conditioning system in accordance with claim 10 in which the refrigeration system has a plurality of condensers, and said stream of water to be heated being directed through one of said condensers.

12. An air conditioning system in accordance with claim 10 in which the condenser of the refrigeration system has separate paths of flow, a circuit including a cooling tower for circulating cooling water through one of the paths of flow through the condenser, and the branch for hot water being connected to deliver a separate stream of water through the other path of flow through the condenser to heat the water.

13. An air conditioning system in accordance with claim 12 in which means are provided in one of the branches including a bypass around the condenser for controlling the stream which cools the condenser.

14. An air conditioning system in accordance with claim 12 in which means are provided in the cooling tower circuit including a bypass around the condenser, and a valve for controlling the flow of water from the cooling tower through the condenser and bypass.

15. An air conditioning system in accordance with claim 12 in which the refrigeration system comprises a condenser for each evaporator, a cooling circuit including conduits connected to said condensers, and valve means in the conduits for connecting the condensers in parallel and in series in the circuit.

16. An air conditioner in accordance with claim 10 in which the hot water branch of the closed circuit has additional heating means therein.

17. An air conditioning system in accordance with claim 10 in which the hot water branch of the closed circuit has an auxiliary loop circuit therein comprising an air-conditioning unit, a heat exchange element, a separate heating means and a pump.

18. In an air conditioning system for a building in which different spaces have different air conditioning requirements, separate primary air conditioning units for the different spaces, auxiliary air conditioning units at a plurality of zones in at least one of the spaces, a closed circuit having a branch for delivering chilled water to the primary and auxiliary air conditioning units and a branch connected in parallel with the first branch for delivering hot water to the primary and auxiliary air conditioning units, a refrigeration unit having an evaporator in the chilled water branch and a condenser in the hot water branch, valve means for each air conditioning unit for controlling the flow of water thereto from the chilled and hot water branches, means connected to the primary and auxiliary air conditioning units for returning water to both branches whereby heat absorbed in the cooling water branch in one space may be used to heat other spaces and an auxiliary loop branch in the hot water branch including at least one of the auxiliary air conditioning units in a zone of a space, a water heating means and a pump for local circulation of hot water through the zone unit.

19. In an air conditioning system for a building in which different spaces have different air conditioning requirements, separate air conditioning units for the different spaces, a plurality of auxiliary air conditioning units in separate zones of at least one of the spaces, a staged refrigeration system comprising a plurality of evaporators operable at successively lower temperatures, means for directing a stream of water through the evaporators in series to cool the water to progressively lower temperatures, heating means, means for directing a stream of water through the heating means to heat the water, a closed circuit having a chilled water branch including the means for directing the stream of water through the evaporators in series and delivering chilled water to each air conditioning unit, a hot water branch including the means for directing a stream of water through the heating means and connected to deliver water from the hot water stream to each of the air conditioning units and return means for delivering water from all of the air conditioning units to the separate branches, valve means for each air conditioning unit for controlling the flow of water thereto from the chilled and hot water branches, and means connecting the plurality or auxiliary air conditioning units in the separate zones in one of the spaces in an auxiliary loop circuit for hot water comprising a heating means and a pump.

20. In an air conditioning system in accordance with claim 19 in which a thermostat is provided which is responsive to the temperature of the water leaving the auxiliary zone units and connected to close the valve to the units and initiate operation of the pump in the auxiliary loop circuit to circulate water through the heating means and auxiliary air conditioning units only.

21. In an air conditioning system for a building in which different spaces have different air conditioning requirements, separate air conditioning units for the different spaces, a central refrigeration system having a series of evaporators operable at successively lower temperatures, means for flowing a stream of conditioning medium through the series of evaporators to cool the medium to successively lower temperatures, a circuit for conditioning medium having branches connected at different zones in the chilled water stream for delivering chilled medium from the stream to each air conditioning unit at the general temperature differential required for its partiuclar heat load, said circuit having a branch for delivering recirculated medium to each air conditioning unit, and valve means for each air conditioning unit operable in response to a condition affected by said unit to automatically regulate the supply of chilled and recirculated medium supplied to a unit whereby to supply medium at a temperature differential for the particular conditions to avoid unnecessary dehumidification.

22. In a refrigeration system having an evaporator, refrigerant condensing means having separate paths of flow for heat transfer liquid, means for withdrawing refrigerant vapor from the evaporator at a low pressure and temperature and delivering said vapor to the condensing means at a high pressure and temperature, a closed circuit having one branch for delivering a heat transfer liquid in heat exchange with the evaporator, a second branch in parallel with the first branch for delivering heat transfer liquid in heat exchange with one path of flow of the condensing means to cool the condenser and a return means for delivering the heat transfer liquid to both branches, a separate open circuit independent of the first closed circuit for circulating a heat transfer liquid through the other path of flow of the condensing means to cool the condenser, and means for controlling the flow of liquid through at least one of the paths of flow of the condensing means.

23. A refrigeration system in accordance with claim 22 in which the control means comprises a restricting means in one path of flow to regulate the temperature of the heat transfer liquid leaving the condensing means in said path of flow.

*24. An air conditioning system for multi-room buildings comprising a plurality of heat-exchange coils in air communication with respective rooms; means for delivering primary air to said rooms; means for flowing room air over said coils in heat-exchange relation therewith; conditioning means for treating said primary air and including a chill liquid coil therein; means providing a stream of chilled liquid and a stream of heated liquid; means for supplying a stream of chilled liquid to said chilled liquid coil and means for supplying a stream of chilled liquid to each of said heat-exchange coils; means for supplying said heated liquid to each of said heat-exchange coils concurrently with said chilled liquid; a common return line leading from each of said coils receiving said heated and chilled liquids and valve means for selectively flowing either said chilled or said heated liquid through said heat-exchange coils dependent on whether cooling or heating of said rooms is required.*

*25. An air conditioning system for multi-room buildings comprising a plurality of conditioning units located in air communication with respective rooms to be conditioned; said units each including a heat-exchange coil and nozzle means; means for supplying primary air to said nozzle means for discharge through said units into said rooms, said air discharging at a sufficient velocity to thereby include a flow of room air through said units and over said heat-exchange coils in heat-exchange relation therewith; conditioning means for treating said primary air and including a heat-exchange coil; fluid supply means for supplying a chilled fluid and a heated fluid; means for routing chilled fluid from said fluid supply means to said conditioner heat-exchange coil and means for routing chilled fluid from said fluid supply means to each of said unit coils; means for routing said heated fluid to each of said unit coils concomitantly with said chilled fluid; a common return line leading from each of said coils receiving said heated and chilled fluids; and valve means for selectively flowing either said chilled or heated fluid through said unit coils dependent on whether said rooms require heating or cooling.*

*26. An air conditioning system for multi-room buildings comprising a plurality of heat-exchange coils in air communication with respective rooms; means for delivering primary air to said rooms; means for flowing room air over said coils in heat-exchange relation therewith; conditioning means for treating said primary air and including a chilled liquid coil therein; a chilled liquid circuit having means for supplying a stream of chilled liquid to said chilled liquid coil and means for supplying a stream of chilled liquid to each of said heat-exchange coils; a heated liquid circuit for supplying a heated liquid to each of said heat-exchange coils concomitantly with said chilled liquid; a common return line leading from each of said coils receiving said heated and chilled liquids; valve means selectively operable to flow either said chilled or said heated liquid through said heat-exchange coils; and refrigeration means for chilling said liquid in said chilled liquid circuit and for heating said liquid in said heated liquid circuit.*

*27. An air conditioning system for multi-room buildings comprising a plurality of heat-exchange coils in air communication with respective rooms; means for delivering primary air to said rooms; means for flowing room air over said heat-exchange coils in heat-exchange relation therewith; conditioning means for treating said primary air and including a chilled liquid coil therein; means providing a stream of chilled liquid and a stream of heated liquid; means for supplying a stream of chilled liquid to said chilled liquid coil and means for supplying a stream of chilled liquid to each of said heat-exchange coils; means for supplying said heated liquid to each of said heat-exchange coils concurrently with said chilled liquid; a common return line leading from each of said heat-exchange coils receiving both said heated liquid and said chilled liquid and valve means for selectively flowing either said chilled or said heated liquid through said heat-exchange coils dependent on whether cooling or heating of said rooms is required.*

*28. An air conditioning system for multi-room buildings comprising a plurality of heat-exchange coils in air communication with respective rooms; means for delivering primary air to said rooms; means for flowing room air over said coils in heat-exchange relation therewith; conditioning means for treating said primary air and including a chilled liquid coil therein; means providing a stream of chilled liquid and a stream of heated liquid; means for supplying stream of chilled liquid to said chilled liquid coil and means for supplying a stream of chilled liquid to each of said heat-exchange coils; means for supplying said heated liquid to each of said heat-exchange coils concurrently with said chilled liquid; a common line receiving all of the liquid from all of said coils and valve means for selectively flowing either said chilled or said heated liquid through said heat-exchange coils dependent on whether cooling or heating of said rooms is required.*

References Cited

The following references, cited by the Examiner, are of record in the patented file of this patent or the original patent.

UNITED STATES PATENTS

| | | |
|---|---|---|
| 1,095,550 | 5/1914 | Clawson. |
| 1,781,024 | 11/1930 | Lidiak. |
| 2,018,453 | 10/1935 | Lawler. |
| 2,181,354 | 11/1939 | Winters. |
| 2,219,815 | 10/1940 | Jones. |
| 2,282,013 | 5/1942 | Wetzeteon. |
| 2,463,881 | 3/1949 | Kemler. |
| 2,715,515 | 8/1955 | Stair. |

FOREIGN PATENTS

| | | |
|---|---|---|
| 594,280 | 3/1934 | Germany. |

ROBERT A. O'LEARY, *Primary Examiner.*

HERBERT L. MARTIN, PERCY L. PATICK, *Examiners.*

S. S. HUSTING, C. SUKALO, *Assistant Examiners.*